US010940608B2

(12) United States Patent
Martin et al.

(10) Patent No.: US 10,940,608 B2
(45) Date of Patent: Mar. 9, 2021

(54) ADHESIVE AND RELEASE LINER APPLICATION SYSTEM

(71) Applicant: National Lumber Company, Mansfield, MA (US)

(72) Inventors: Brocklyn Martin, East Earl, PA (US); Jansen Burkholder, Stevens, PA (US); Peter Bogush, Narvon, PA (US); David Bruce, North Chelmsford, MA (US); Robert Thompson, Farmington, CT (US); Paul J. VanBuskirk, Fanwood, NJ (US); Steven Camacho, Whitefish Bay, WI (US); Michael J. Etzel, Glendale, WI (US); Derek Daniel Bennett, East Troy, WI (US)

(73) Assignee: National Lumber Company, Mansfield, MA (US)

( * ) Notice: Subject to any disclaimer, the term of this patent is extended or adjusted under 35 U.S.C. 154(b) by 39 days.

(21) Appl. No.: 16/381,279

(22) Filed: Apr. 11, 2019

(65) Prior Publication Data
US 2019/0329444 A1 Oct. 31, 2019

Related U.S. Application Data

(60) Provisional application No. 62/662,309, filed on Apr. 25, 2018.

(51) Int. Cl.
*B27M 3/00* (2006.01)
*B05D 5/10* (2006.01)
(Continued)

(52) U.S. Cl.
CPC .......... *B27M 3/0026* (2013.01); *B05C 5/002* (2013.01); *B05C 11/00* (2013.01); *B05D 5/10* (2013.01);
(Continued)

(58) Field of Classification Search
CPC ...... B27M 3/0026; B05C 5/002; B05C 11/00; B05D 5/10; B05D 7/06; B27F 7/36;
(Continued)

(56) References Cited

U.S. PATENT DOCUMENTS 5,120,378 A * 6/1992 Porter .................... B27G 11/00
144/278.1
5,254,203 A * 10/1993 Corston .............. B25B 27/0092
118/207

(Continued)

*Primary Examiner* — George R Koch
(74) *Attorney, Agent, or Firm* — Iandiorio Teska & Coleman, LLP

(57) ABSTRACT

An adhesive and release liner application system and method. A bottom table is slidable with respect to a frame and a middle table is slidable with respect to the bottom table. An elevator drive subsystem between a top table and the middle table is configured to adjust the elevation of the top table relative to the middle table. An adhesive head, connected to an adhesive supply subsystem, a release liner applicator, a release liner cutter, and a staple gun are mounted to the top table for applying the adhesive to a surface of a structural member positioned adjacent the top table, for applying a release liner over the adhesive on the surface, for inserting at least one staple through the release liner and into the surface, and for cutting the release liner.

8 Claims, 8 Drawing Sheets

(51) Int. Cl.
  *B05D 7/06*   (2006.01)
  *B05C 5/00*   (2006.01)
  *B27F 7/36*   (2006.01)
  *B27G 11/00*  (2006.01)
  *B05C 11/00*  (2006.01)
  *E04C 3/02*   (2006.01)
  *F16B 11/00*  (2006.01)

(52) U.S. Cl.
  CPC ............ *B05D 7/06* (2013.01); *B27F 7/36* (2013.01); *B27G 11/00* (2013.01); *E04C 3/02* (2013.01); *F16B 11/006* (2013.01)

(58) Field of Classification Search
  CPC ....... B27G 11/00; B27G 11/005; B32B 41/00; B32B 2041/06; E04C 3/02; F16B 11/006
  See application file for complete search history.

(56) References Cited

U.S. PATENT DOCUMENTS

| | | | | |
|---|---|---|---|---|
| 5,403,414 | A * | 4/1995 | Corston | B25B 27/0092 156/71 |
| 6,263,636 | B1 * | 7/2001 | Corston | B25B 27/0092 156/78 |
| 7,918,960 | B1 * | 4/2011 | Robell | E04C 3/14 156/256 |
| 8,915,280 | B1 * | 12/2014 | Robell | B27G 11/00 156/524 |
| 10,744,613 | B2 * | 8/2020 | Kostenbader | B29C 63/0065 |
| 2006/0101785 | A1 | 5/2006 | Wiercinski et al. | |

* cited by examiner

ADHESIVE AND RELEASE LINER APPLICATION SYSTEM

RELATED APPLICATIONS

This application claims benefit of and priority to U.S. Provisional Application Ser. No. 62/662,309 filed Apr. 25, 2018, under 35 U.S.C. §§ 119, 120, 363, 365, and 37 C.F.R. § 1.55 and § 1.78, which is incorporated herein by this reference.

FIELD OF THE INVENTION

This subject invention relates to a system which applies a layer of adhesive and release liner to I-joists and other building elements and engineered wood products.

BACKGROUND OF THE INVENTION

When workers deploy I-joists and other engineered wood products as structural components in buildings, the workers often manually apply adhesive to the top flange of the I-joist and then secure subflooring or other materials to the I-joist. See U.S. published Patent Application No. 2006/0101785 and U.S. Pat. Nos. 5,254,203 and 6,263,636 all incorporated herein by this reference.

In U.S. Pat. Nos. 7,918,960 and 8,915,280, both also incorporated herein by this reference, a very specific machine is used to pre-apply the adhesive and a release liner to an I-joist. In some cases, that machine is difficult to operate and failed in some instances to properly apply the adhesive and/or release liner to the I-joist flange. In some cases, the release liner had to be manually applied. Also, one or more manual adjustments to the machine was often required.

BRIEF SUMMARY OF THE INVENTION

Featured is an improved adhesive and release liner application system. The preferred system better ensures the release liner is adequately applied over the adhesive on an I-joist flange. The preferred system is automated so that one or more aspects of the machine which previously had to be carried out manually are now automatically controlled.

Featured is an adhesive and release liner application system including a frame, a bottom table slidable with respect to the frame, at least a first actuator (e.g., mounted to the frame) for driving the bottom table relative to the frame, a middle table slidable with respect to the bottom table, and at least a second actuator (e.g., mounted to the bottom table) for driving the middle table relative to the bottom table. There is a top table and an elevator drive subsystem between the top table and the middle table configured to adjust the elevation of the top table relative to the middle table. An adhesive head connected to an adhesive supply subsystem, a release liner applicator, a release liner cutter, and a staple gun are all mounted to the top table. A release liner applicator actuator is configured to drive the release liner applicator relative to the top table, a release liner cutter actuator is configured to drive the release liner cutter relative to the top table, and a staple gun actuator is configured to drive the staple gun relative to the top table.

A control subsystem is configured, in some embodiments, to signal the first actuator to adjust the position of the bottom table relative to the frame, to signal the second actuator to adjust the position of the middle table relative to the bottom table, and to signal the elevator drive subsystem to adjust the elevation of the top table relative to the middle table. The control subsystem is preferably configured to signal the adhesive supply subsystem to supply adhesive to the adhesive head for applying adhesive to a surface of a structural member positioned adjacent the top table, to signal the release liner applicator actuator and release liner applicator to apply a release liner over the adhesive on the surface, to signal the staple gun actuator and staple gun to insert at least one staple through the release liner and into the surface, and to signal the release liner cutter actuator to cut the release liner.

In one preferred embodiment, the frame may include a pair of top rails and the underside of the bottom table includes a pair of corresponding static linear slide bearings slidable along the pair of top rails of the frame. The top of the bottom table may include a pair of rails and the underside of the middle table includes a pair of corresponding linear slide bearings slidable along the rails of the bottom table. The elevator drive subsystem may include a scissor jack between the middle table and the top table and a scissor jack actuator driving the scissor jack to adjust the elevation of the top table relative to the middle table.

The system may further include one or more feeder mechanisms for driving the surface past the top table and the one or more feeder mechanisms are preferably controlled by the controller subsystem. The top table may further include a horizontal roller in engagement with the surface of the structural member. The system may further include an activated vertical roller brought into engagement with the structural member and controlled by the controller subsystem.

Also featured is an adhesive and release liner application method. One preferred method includes providing a bottom table slidable with respect to a frame, providing a middle table slidable with respect to the bottom table, providing a top table and an elevator drive subsystem between the top table and the middle table configured to adjust the elevation of the top table relative to the middle table, and providing, on the top table, an adhesive head, a release liner applicator, a release liner cutter, and a staple gun mounted to the top table. The method may include adjusting the position of the bottom table relative to the frame, adjusting the position of the middle table relative to the bottom table, and adjusting the elevation of the top table relative to the middle table. Adhesive is supplied to the adhesive head and is applied to a surface of a structural member positioned adjacent the top table. A release liner is applied over the adhesive on the surface. At least one staple is inserted through the release liner and into the surface. The release liner is then cut.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
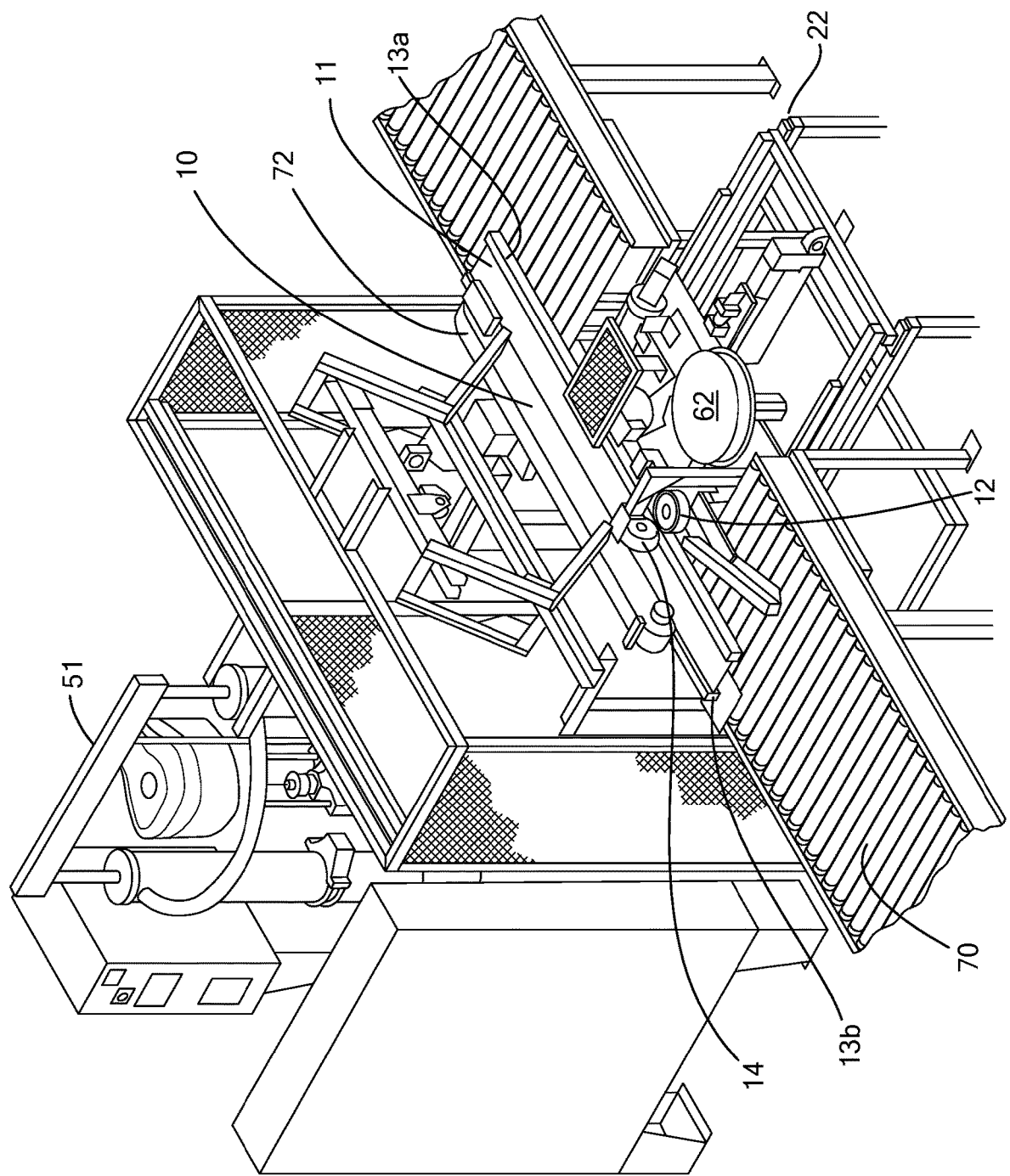
FIGS. 1-3 are schematic views of an I-joist in position for the application of an adhesive and release liner thereto at the station of the system.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

In one design as shown in FIGS. 1-5 a cut I-joist 11 proceeds out of a saw substation along a conveyor 70 and to a station where the adhesive and release liner (film) are applied to the outer face of flange 13a. The I-joist may be purchased from Boise Cascade.

One preferred station includes an overhead actuated belt driven feeder 10 which drives the I-joist as the adhesive and release liner are applied. The belt feeder engages the top edge of rear flange 13b. The I-joist is preferably guided by a horizontal wheel 12 and vertical pinch roller 14 which is pushed down against the edge of the I-joist flange 13a via actuator 16. Horizontal wheel in this example is fixed in place but does rotate.

Figure 4:
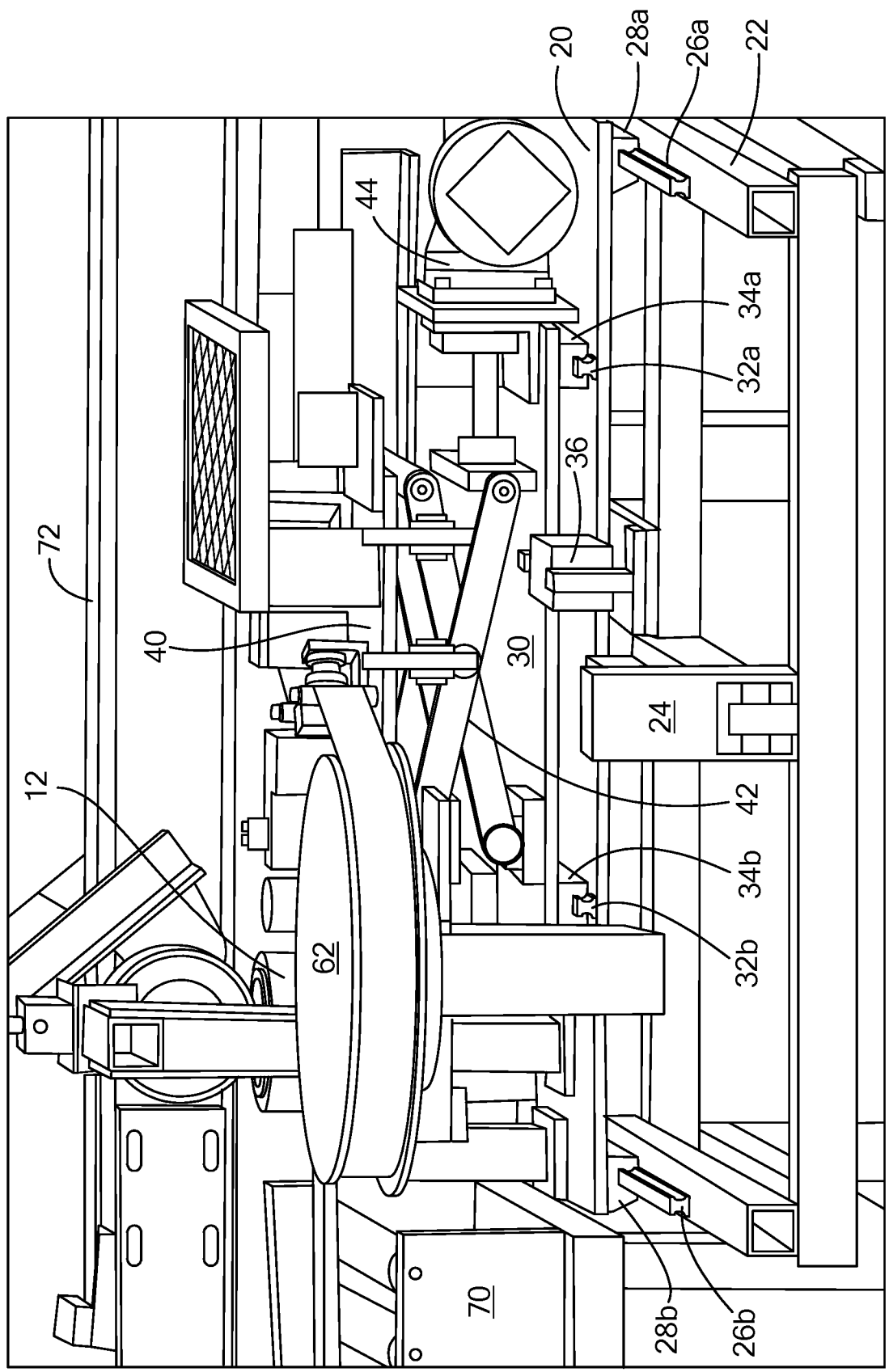
FIG. 4 is a schematic front view of the preferred station of the system.

The station preferably includes three tables. Bottom table 20, FIG. 4 is mounted to frame 22 and can be driven towards and away from the I-joist via actuator 24 mounted to frame 22 and including a piston connected to bottom table 20. Frame 22 includes rails 26a and 26b and the underside of bottom table 20 includes corresponding static linear slide bearings 28a, 28b.

Intermediate or middle table 30 is mounted to bottom table 20 via a similar set of rails 32a, 32b and static linear slide bearings 34a, 34b. Intermediate table 30 is driven towards and away from the I-joist via actuator 36 mounted to bottom table 20 driving a piston connected to intermediate table 30.

Head or top table 40 is mounted to intermediate table 30 via an automatic lifting or elevating drive mechanism or subsystem such as scissor jack 42 driven by motor 44 and associated gearing. In this particular embodiment, top table 40 does not move with respect to middle table 30 except up and down with respect thereto.

Figure 5:
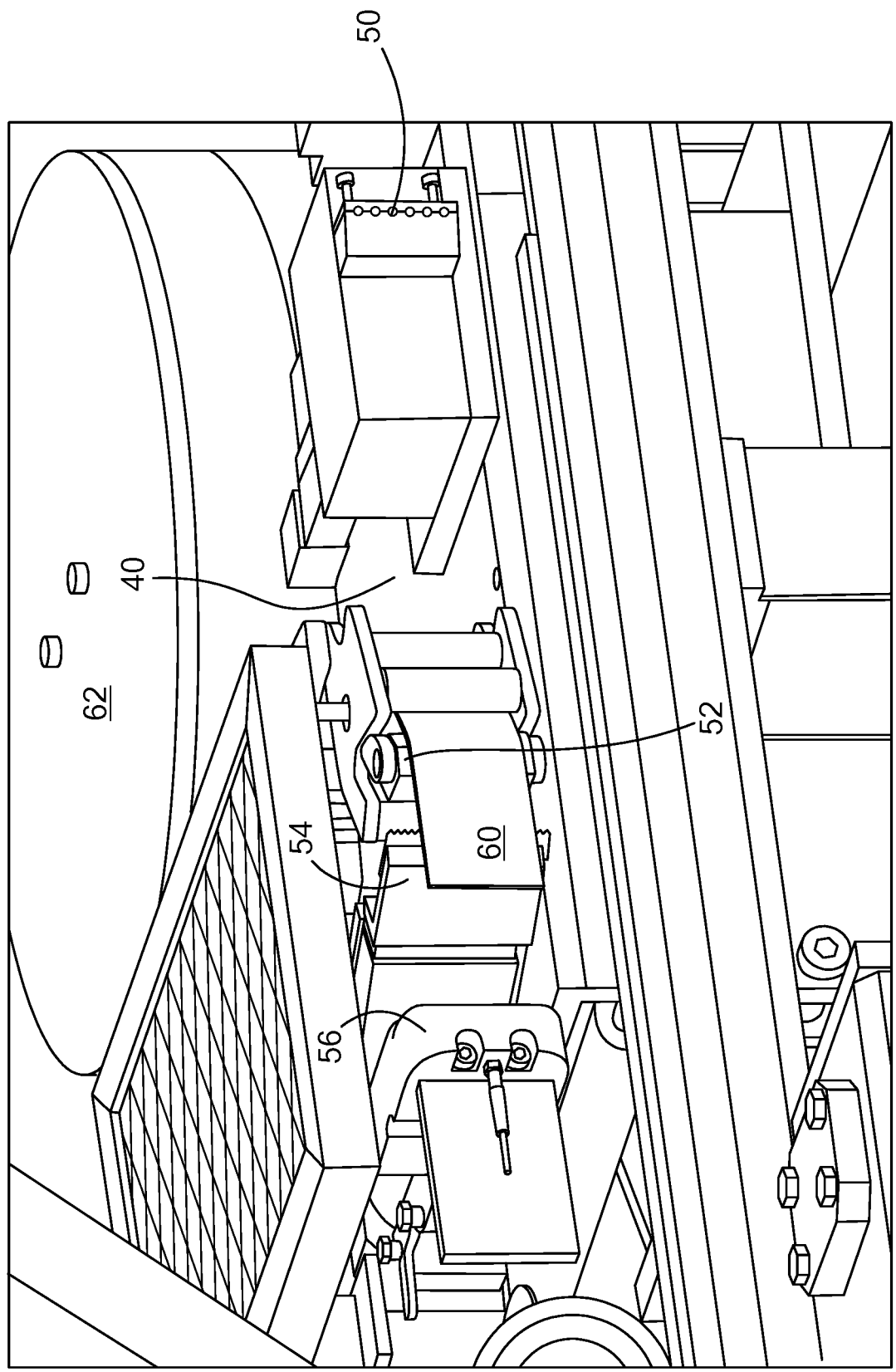
FIG. 5 is a schematic rear view of the station.

Mounted to head table 40 in this version are glue head 50, FIG. 5, liner applicator head 52, liner cutter 54, staple gun 56, and wheel 12.

The bottom table is usually only adjusted relative to the frame for maintenance or to accommodate larger size I-joists or other products. Head or top table 40 is also adjusted via the motor driven scissor jack based on the size of the I-joist.

By moving middle table 30 relative to bottom table 20, the top table and its components are driven closer to and further away from the I-joist.

For normal operations, an I-joist arrives at the station and the intermediate or middle table is linearly driven along with the top table ½" or so closer to the I-joist where upon the glue head 50, FIG. 5 is actuated to lay down a layer of adhesive from the adhesive supply subsystem (51, FIG. 1) onto the I-joist flange. Adhesive of a predetermined thickness and width is laid down as the belt driven feeder drives the I-joist pass the glue head. At the same time, the liner head 52 applies the liner 60 from liner reel 62 over the glue. Liner head 52 may include vacuum ports to keep the liner in place on the head. There is no need for pressure application means for applying pressure against the protective release liner to form the adhesive since the adhesive head 50 applies a predetermined thickness and width layer of adhesive to the I-joist. The belt driven feeder then stops the travel of the I-joist in order for the staple head 56 to staple the leading portion of the liner to the I-joist. This ensures the release liner is secured to the I-joist flange. The belt driven feeder then continues to drive the I-joist through the station until the length of the I-joist flange has applied thereto the adhesive and liner. The liner cutter 54 is then actuated to cut the liner.

The liner head, the cutter, and the staple gun may each be independently driven relative to the head or top table 40 via various actuators. The glue head in this embodiment is not actuated to move relative to the top table.

Figure 2:
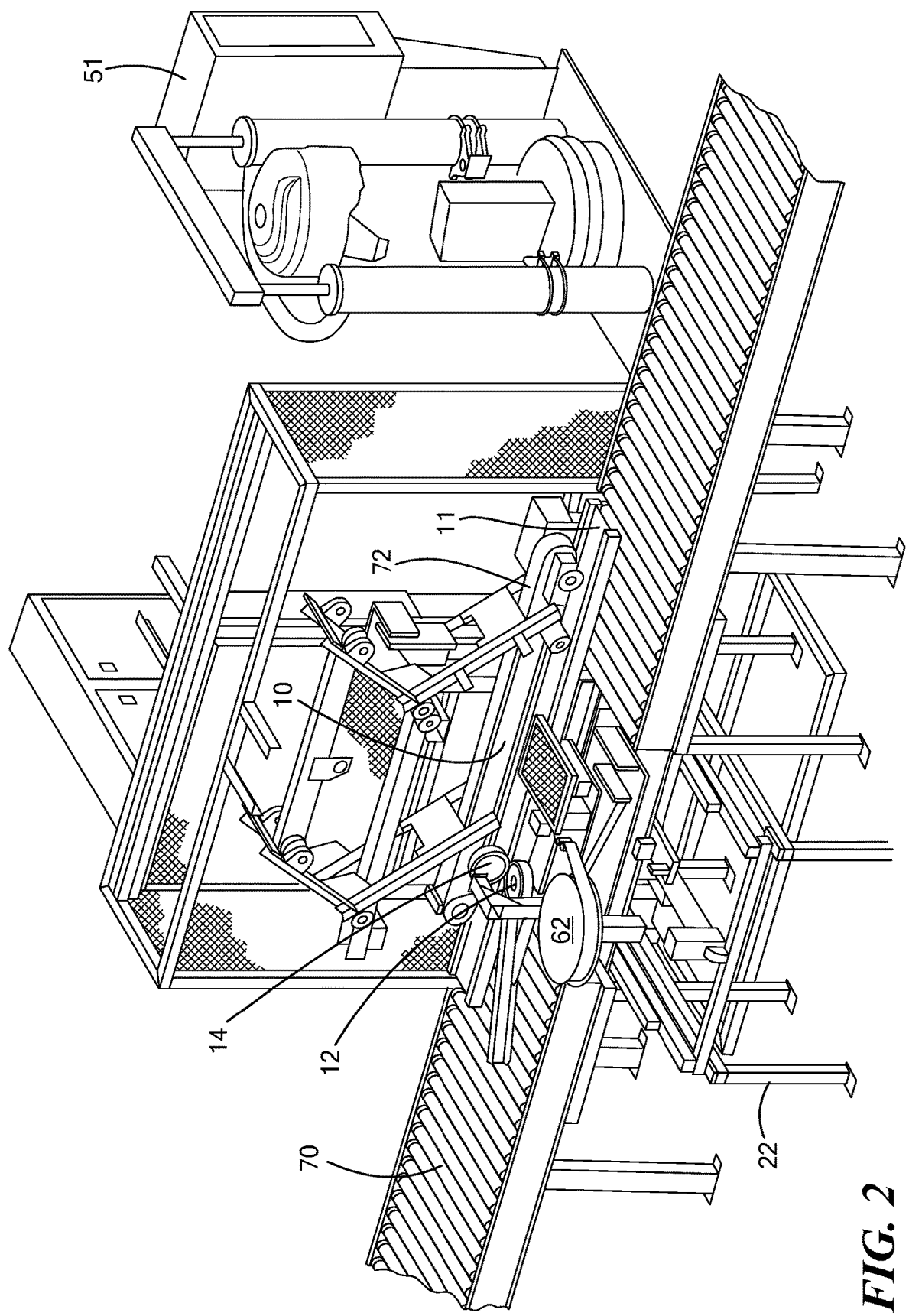
Figure 3:
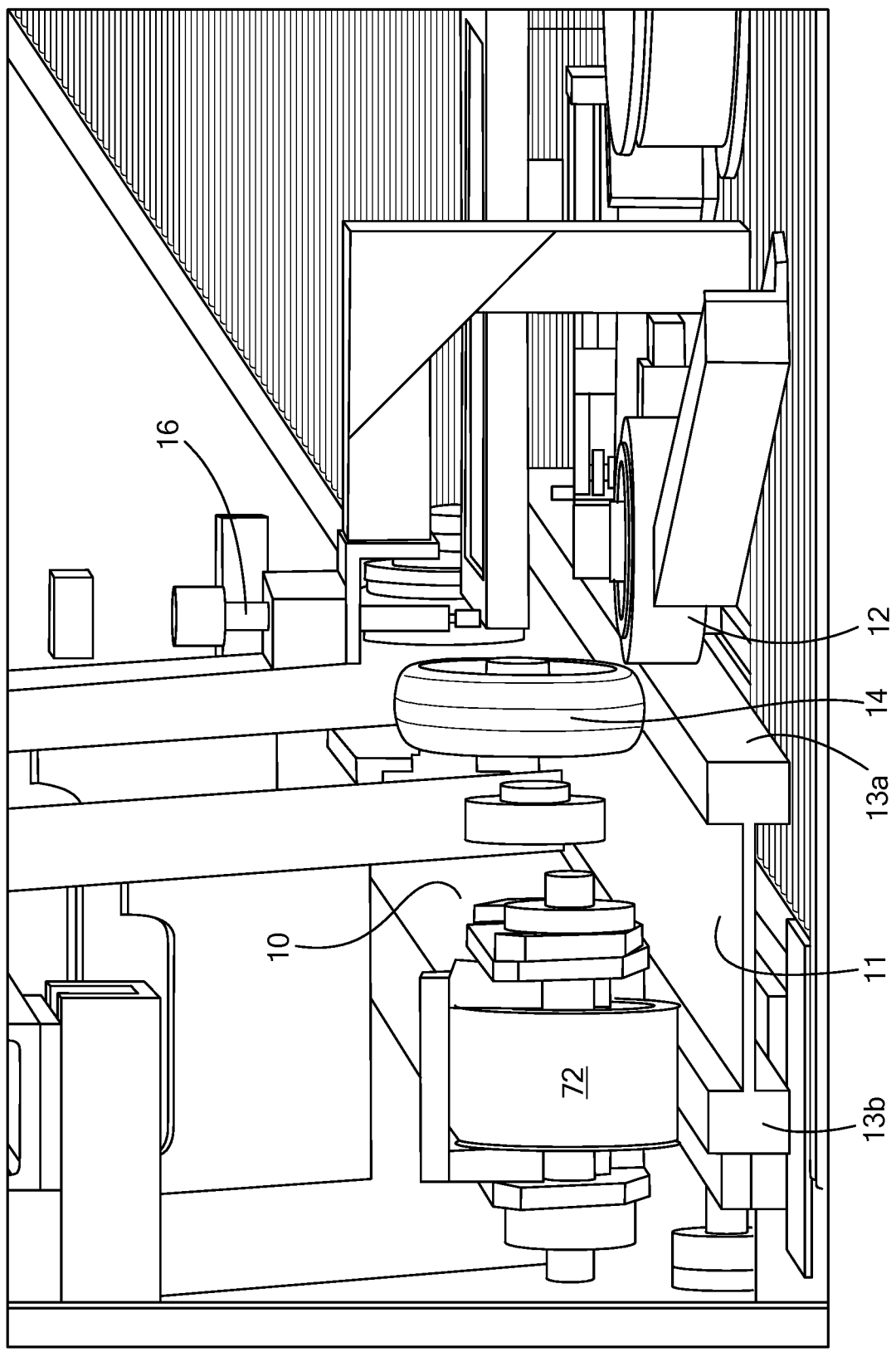
Figure 6:
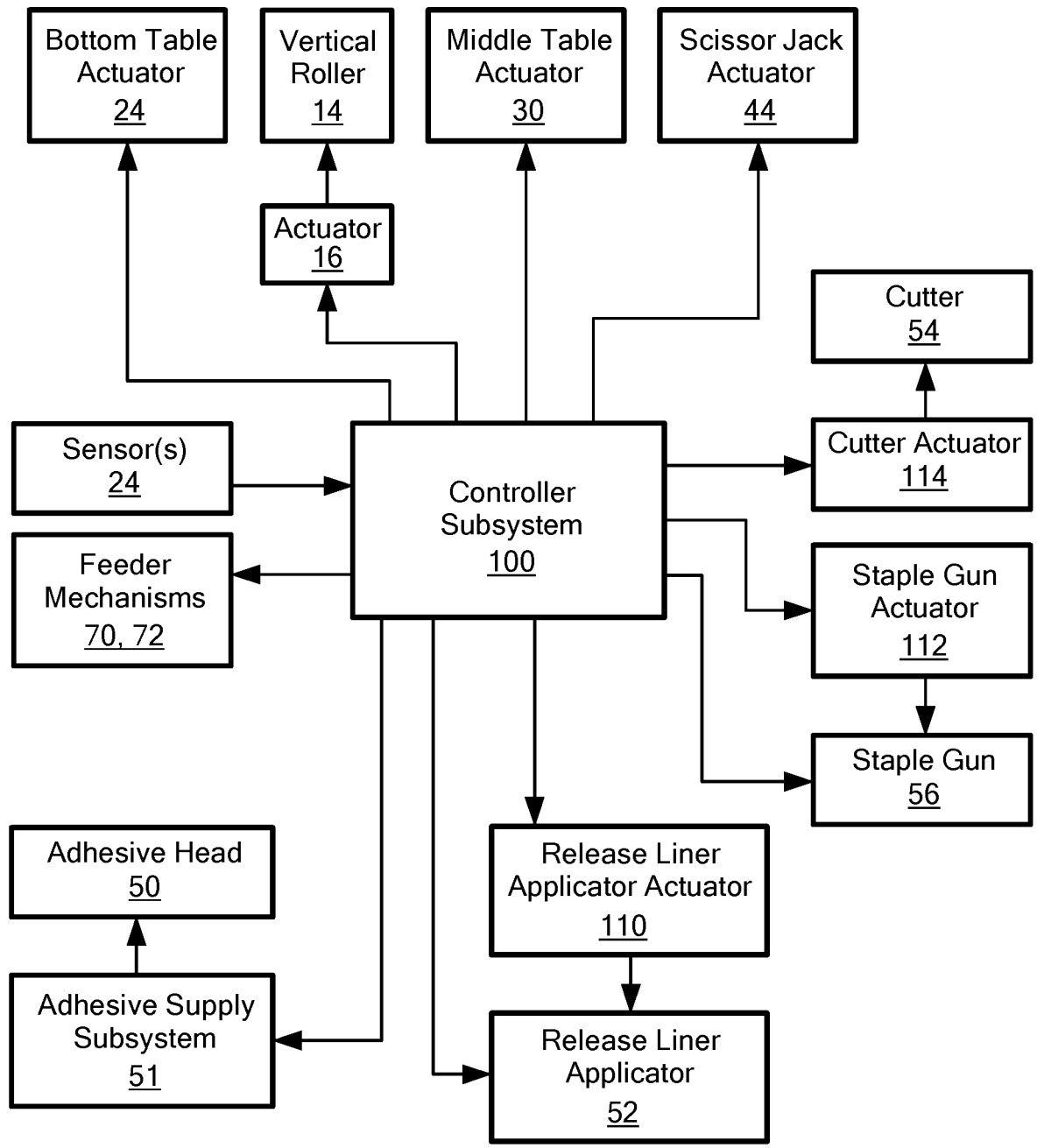
FIG. 6 is a block diagram of the primary components of the system in one example.
Figure 7:
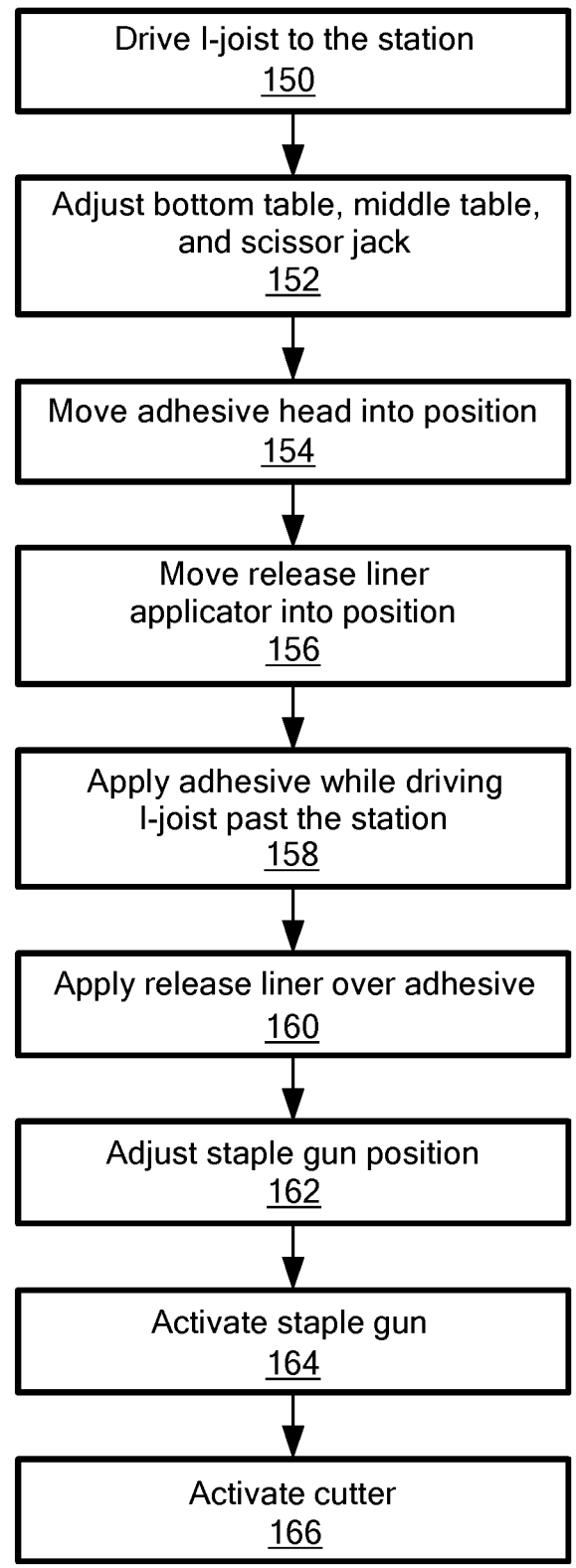
FIG. 7 is a flow chart depicting the primary steps associated with a new method of applying an adhesive and release liner to an engineered wood product in accordance with an example of the invention and also depicting the primary aspects of the logic associated with the controller subsystem of FIG. 6.

As shown in FIGS. 6-7, a controller subsystem 100 (for example a stand alone or networked computer, one or more microcontrollers, one or more application specific integrated circuits, or the like) includes logic which controls the I-joist feeder mechanisms such as conveyor 70, FIG. 2 and belt drive 72 to drive an I-joist 11 proximate the work station (step 150, FIG. 5) for the application of an adhesive to flange 13a, FIG. 1 of the I-joist and the application of release liner over the adhesive. The controller subsystem may receive signals from the saw station controller.

As such, controller subsystem 100 logic controls the actuator 16 for vertical roller 14, the bottom table actuator 24, the middle table actuator 30, the scissor jack actuator 44 (e.g., a servomotor), the adhesive head 50, and adhesive supply subsystem 51 (typically including a heater for a hot melt adhesive supplied in a drum and the associated pumps and conduits which deliver the hot melt adhesive to the adhesive head 50). In one version, the adhesive supply subsystem is A Graco Inc. Model #TOFB-200-E-21P-3M-2-P1 Thermo-Flow 200 Hot Melt Pumping System with a Model #PF1500 Heated Precision Flow Control System. In one preferred example a CA-4227 hot melt adhesive available from Adhesive Specialists, Inc. is used. Also the release liner may be roll of 111647 2" wide liner available from Rayven, Inc. Other adhesives and release tape/liners are disclosed in U.S. published Patent Application 200610101785 incorporated herein by this reference.

The controller subsystem 100 also controls the release liner applicator actuator 110, FIG. 6 and release liner application subsystem 52, the staple gun actuator 112 and the staple gun 56, and the cutter actuator 114 to drive the cutter 54 into position to cut the release liner at the end of the I-joist.

In step 152, FIG. 7, the bottom table, middle table, and/or the scissor servo motor are properly adjusted base on the size and position of the I-joist (using the output of one or more sensors 114, for example) in order to properly apply the adhesive and release liner to the top flange of the I-joist.

Typically, for a run of a given size I-joist, the bottom table and the scissor jack need not be adjusted and only the middle table actuator is adjusted to bring the top table and its adhesive head, release liner applicator, staple gun, and cutter into contact with the top I-joist flange. The vertical roller is adjusted to engage the I-beam.

The adhesive head is thus moved into contact with the I-joist flange of the I-joist at the leading portion of the I-joist and, as the I-joist is driven forward, the adhesive is applied to the top flange of the I-joist. Similarly, the release liner applicator is moved into position and the release liner is applied over the adhesive as the I-joist is driven forward. See steps 154-160, FIG. 7.

Figure 8:
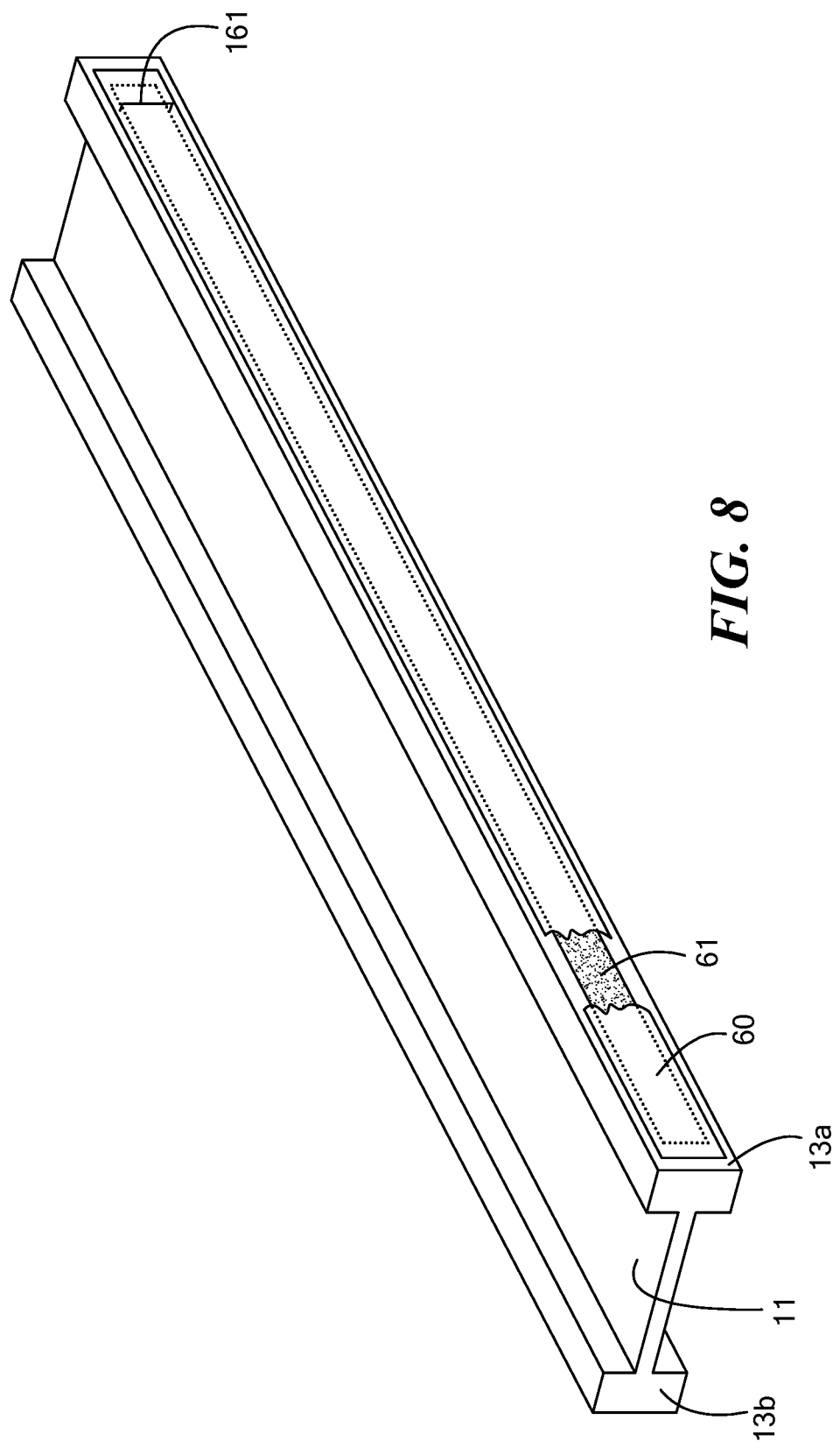
FIG. 8 is a view showing how the system of FIGS. 1-4 applies adhesive, release liner, and a staple to an I-joist in accordance with an example of the invention.

The staple gun is also brought into position to place a staple through the release liner and into the I-joist flange at the leading position of the I-joist flange where the liner is first laid down as shown in FIG. 8 where adhesive 61, release liner 60, and staple 161 are shown on the top surface of 13*a* the top I-joist flange. See steps 162-164, FIG. 7. As the trailing end of the I-joist passes the work station, the release liner is cut by actuating the cutter, step 166.

Thus, preferably, the adhesive head is fixed relative to the top table which is adjusted via actuator 24, actuator 36, and scissor jack 42 via motor 44 to correctly bring the adhesive head into contact with the top surface of I-joist top flange. These actuators also roughly position the cutter, the staple gun, and the release liner applicator proximate the top surface of the I-joist top flange. But, in some preferred embodiments, the cutter, staple gun, and release liner actuator are movable relative to the top table via cutter actuator 114, staple gun actuator 112, and release liner actuator 110, respectively. In one design, the release liner cutter moves independently via a pneumatic cylinder, the stapler moves independently via a pneumatic cylinder, and the release liner advances forward via a servo motor and is held in place via a pneumatic cylinder. Also, a vacuum block holds the release liner in place at the point of contact of the I-Joist and also blows off the release liner once the task is complete.

The building products with the adhesive and release liner applied thereto can be stored in the lumber yard until pick-up by a contractor. The release liner protects the adhesive from the elements. At the building site, the building products are installed in their normal manner and then the release liner is pealed off the I-joists exposing the adhesive. Then, subflooring or other building materials are secured to the I-joists.

Although the subject disclosure is fairly specific with respect to I-joist, an adhesive and release tape or liner can be applied by the system to other structural members and engineered wood products. The result is an improved adhesive and release liner application system which better ensures the release liner is automatically applied over the adhesive on an I-joist flange and which automates one or more aspects which were previously carried out manually. Reliability is improved and the system is more accurately controlled. They system of three tables on a frame also ensures better application of the adhesive and release liner. Contrary to the system described in U.S. Pat. No. 8,915,280, there is no need in the preferred system disclosed here for an angled wheel, a floating subbase supported by wheels on rails, manual adjustment of the adjustable base structure, or release liner pressure application means.

Exemplary logic for the controller subsystem is as follows:

1. The Saw broadcasts Board Data (x,y,z) for the most recently cut board, and pushes board laterally to Transfer Chains when transfer chains are ready (clear) (xyz data from Saw, transfer ready signal to Saw).
2. If Inbound conveyor is ready and stopped, and transfer chains verify presence of board, raise necessary popup transfers. Send acknowledge signal to the Saw when board is accepted?
3. Start and stop transfer chains to position board over inbound conveyor.
4. Lower popup transfers, send Ready signal to Saw that transfer chains are ready for next board.
5. If Outbound and Glue Station are clear and ready, start Inbound conveyor (fast), also position Glue Station table Y and Z Axis determined by board data.
6. When board reaches glue station change speed to slow.
7. Lower Pinch feeder belt drive and run Pinch Feeder motor (slow).
8. Position board for glue applicator and:
   a. continue at slow speed and start glue applicator if Table Y and Z position are correct, or:
   b. stop and wait if Table Y and Z position are not ready, when ready and board is in position for glue applicator, start glue applicator (slow) and advance board to pick up tape.
9. Stop board at Stapler position.
10. Set Staple through tape into board.
11. Ramp board up (inbound, pinch feeder, and outbound set to same speed) to max speed allowable for glue and tape feeding (set tape feed servo tension).
12. Maintain constant speed of board (inbound, pinch feeder, and outbound), glue flow speed, and tape tension. Arm tape cutter.
13. When end of board is detected:
    a. Stop inbound conveyor.
    b. at glue applicator, stop glue applicator.
    c. at cutter: fire tape cutter cylinder and stop tape feed servo, also ramp down board to slow speed.
14. Raise Pinch feeder after board has exited belt drive and stop pinch feeder motor.
15. Stop outbound conveyor when board is detected at end of conveyor, or after some time elapsed after exiting pinch feeder.
16. After board has been manually cleared (removed) from outbound conveyor, a push button (Start/Go) mounted at/on outbound conveyor, will need to be pressed and released before the Inbound conveyor will be allowed to run again.

Any pressed E-stop or opened safety gate switches stop all motors and servos

Any pressed Pause button will stop any active conveyors and glue and prevent them from running; All Pause buttons must then be pulled up, then the Go/Start button pressed to restart/enable automatic operation.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. An adhesive and release liner application system comprising:
    a frame;
    a bottom table slidable with respect to the frame;
    at least a first actuator mounted to the frame for driving the bottom table relative to the frame;
    a middle table slidable with respect to the bottom table;
    at least a second actuator mounted to the bottom table for driving the middle table relative to the bottom table;
    a top table;
    an elevator drive subsystem between the top table and the middle table configured to adjust the elevation of the top table relative to the middle table;
    an adhesive head connected to an adhesive supply subsystem;
    a release liner applicator, a release liner cutter, and a staple gun mounted to the top table;
    a release liner applicator actuator configured to drive the release liner applicator relative to the top table;
    a release liner cutter actuator configured to drive the release liner cutter relative to the top table;
    a staple gun actuator configured to drive the staple gun relative to the top table; and
    a control subsystem configured to:
        signal the first actuator to adjust the position of the bottom table relative to the frame,
        signal the second actuator to adjust the position of the middle table relative to the bottom table,
        signal the elevator drive subsystem to adjust the elevation of the top table relative to the middle table,
        signal the adhesive supply subsystem to supply adhesive to the adhesive head for applying said adhesive to a surface of a structural member positioned adjacent the top table,
        signal the release liner applicator actuator and the release liner applicator to apply a release liner over the adhesive on the surface,
        signal the staple gun actuator and the staple gun to insert at least one staple through the release liner and into the surface, and
        signal the release liner cutter actuator to cut the release liner.

2. The system of claim 1 in which the frame includes a pair of top rails and the underside of the bottom table includes a pair of corresponding static linear slide bearings slidable along the pair of top rails of the frame.

3. The system of claim 1 in which the top of the bottom table includes a pair of rails and the underside of the middle table includes a pair of corresponding linear slide bearings slidable along the pair of rails of the bottom table.

4. The system of claim 1 in which the elevator drive subsystem includes a scissor jack between the middle table and the top table and a scissor jack actuator driving the scissor jack to adjust the elevation of the top table relative to the middle table.

5. The system of claim 1 further including one or more feeder mechanisms for driving the surface past the top table, said one or more feeder mechanisms controlled by the control subsystem.

6. The system of claim 1 in which the top table further includes a horizontal roller in engagement with the surface of the structural member.

7. The system of claim 1 further including an activated vertical roller brought into engagement with the structural member and controlled by the control subsystem.

8. An adhesive and release liner application system comprising:
    a frame;
    a bottom table slidable with respect to the frame;
    at least a first actuator for driving the bottom table relative to the frame;
    a middle table slidable with respect to the bottom table;
    at least a second actuator for driving the middle table relative to the bottom table;
    a top table;
    an elevator drive subsystem between the top table and the middle table configured to adjust the elevation of the top table relative to the middle table;
    an adhesive head connected to an adhesive supply subsystem;
    a release liner applicator, a release liner cutter, and a staple gun mounted to the top table;
    a release liner applicator actuator configured to drive the release liner applicator relative to the top table;
    a release liner cutter actuator configured to drive the release liner cutter relative to the top table;
    a staple gun actuator configured to drive the staple gun relative to the top table; and
    a control subsystem configured to:
        signal the adhesive supply subsystem to supply adhesive to the adhesive head for applying said adhesive to a surface of a structural member positioned adjacent the top table,
        signal the release liner applicator actuator and the release liner applicator to apply a release liner over the adhesive on the surface,
        signal the staple gun actuator and the staple gun to insert at least one staple through the release liner and into the surface, and
        signal the release liner cutter actuator to cut the release liner.

* * * * *